United States Patent [19]

Loriot

[11] Patent Number: 4,982,437

[45] Date of Patent: Jan. 1, 1991

[54] METHOD OF CUTTING AN OBJECT AS A FUNCTION OF PARTICULARITIES OF SAID OBJECT

[75] Inventor: Jean-Marc Loriot, Paris, France

[73] Assignee: Manufacture Francaise des Chaussures Eram, Saint Pierre Montlimart, France; a part interest

[21] Appl. No.: 145,936

[22] Filed: Jan. 20, 1988

[30] Foreign Application Priority Data

Jan. 20, 1987 [FR] France ................................ 87 00628

[51] Int. Cl.[5] ................................................ G06K 9/00

[52] U.S. Cl. ............................................ 382/8; 381/1; 356/71; 364/470

[58] Field of Search ................. 382/1, 8, 48; 358/101, 358/107, 211, 228; 356/71; 364/518, 478; 250/293.1, 564 R, 458, 459.1, 461.1, 462.1, 463.1, 483.1; 51/35; 33/11

[56] References Cited

U.S. PATENT DOCUMENTS 3,596,068 7/1971 Doyle ...................................... 33/11
4,112,626 7/1978 Watanabe et al. ...................... 51/35
4,503,466 3/1985 Ryan .................................. 358/211
4,575,628 3/1986 Bankart et al. ..................... 356/377
4,598,322 7/1986 Atherton ............................ 358/211

*Primary Examiner*—David K. Moore
*Assistant Examiner*—Jose L. Couso
*Attorney, Agent, or Firm*—Sughrue, Mion, Zinn, Macpeak & Seas

[57] ABSTRACT

A method of cutting a sheet 1 with a tool controlled by a computer system and in accordance with a cutting program that may depend on certain particularities of the sheet. The computer system examines the sheet by scanning it with a video camera. Prior to scanning an operator marks certain of the particularities directly on the sheet using a fluorescent marker, the marking being in the form of distinctive symbols 2, 3, 4, 5, 6 which are detectable by the camera and which are interpretable as being constraints on cutting to be taken into account by the cutting program. The sheet is illuminated by ultraviolet light while it is being scanned by the camera, and the scanning speed of the camera is adjusted as a function of the required sensitivity. The scanning speed lies in the range 10 to 40 images per second, and is preferably about 25 images per second.

9 Claims, 4 Drawing Sheets

METHOD OF CUTTING AN OBJECT AS A FUNCTION OF PARTICULARITIES OF SAID OBJECT

The present invention relates to a method of cutting an object, in particular an object in sheet form, by means of a tool controlled by a computer system and in accordance with a cutting program which may depend on certain particularities of said object.

BACKGROUND OF THE INVENTION

When cutting an object, for example an animal skin, using a tool controlled by a computer system, it is necessary to previously define a cutting program, and said program must take account of certain particularities of the skin to be cut, for example its shape and its orientation relative to said tool, and also possible defects therein. In order to cut pieces out from an animal skin having predetermined shapes, templates having said shapes may be placed manually on the skin and the computer may be required to read the positions of the templates relative to the position of the skin and to store them in memory for cutting-out purposes. A competent operator is capable of placing templates on the skin in such a manner as to take account of possible defects therein. It is also possible to place the templates interactively using the screen of a computer terminal which includes an inputting accessory such as a keyboard associated with a digitizing table and a screen which displays an image of the skin together with the templates; however most defects do not then appear on the screen because of the poor sensitivity of the cameras currently in use, and as a result these defects cannot be taken into account when defining a cutting-out program.

The aim of the present invention is to provide a method of cutting out pieces from an object, in particular an object in sheet form, by means of a tool which is controlled by a computer system in accordance with a cutting program that may depend on certain particularities of said object, and in particular on defects therein, without it being necessary to manually place templates having the shapes of said pieces, i.e. the invention seeks to define the cutting program directly on said object.

SUMMARY OF THE INVENTION

According to the present invention, in a method of cutting an object, in particular an object in the form of a sheet, by means of a tool controlled by a computer system and in accordance with a cutting program that may depend on certain particularities of said object, with said computer system examining said object by being connected to a camera for scanning said object, certain of said particularities are marked directly on said object by an operator prior to said scanning, said particularities being marked by marking means in the form of distinctive symbols which may be coded or otherwise, which are detectable by said camera, and which are interpretable as being constraints on cutting which are to be taken into account in said cutting program.

More particularly, according to the present invention, said marking means is fluorescent and said object is illuminated by a source of ultraviolet light while it is being scanned by said camera, thereby avoiding limiting the invention to objects of certain colors only. Simultaneously the scanning speed of the camera is adjustable as a function of the required sensitivity, and may then be fixed for a given scan. Advantageously, the object is placed in front of a fluorescent background while it is being scanned by said camera.

The scanning speed must be slow enough for said symbols to be detectable by said camera, and may lie, for example, in the range of about 10 images per second to about 40 images per second giving a scanning frequency of about 10 Hz to about 40 Hz, which frequency should preferably be 25 Hz.

Advantageously, the distinctive symbols include marking in fluorescent chalk in order to indicate a particular zone of the object together with a fluorescent sticker or an arrangement of fluorescent stickers characteristic of said particular zone being stuck on said object in the vicinity of said particular zone, thereby enabling the zone to be identified by the shape, the size, and the disposition of said sticker(s).

In another embodiment of the invention, said computer system has a memory storing cutting instructions, and said symbols are encoded and are interpretable by the computer system as being constraints on cutting which are to be combined with said cutting instructions in order to define said cutting programs. One of said cutting instructions may, for example, be an instruction to cut out as many pieces of predetermined shape as possible from said object without some of the shapes being cut out from portions of said object which correspond to certain of said particularities, in particular to defects in the object. If defects are present, some of the pieces may be cut out from portions of said object having certain kinds of defect, and some defects may be acceptable in one portion of a piece but not in another portion of the same piece.

Advantageously, said computer system displays images of the object on a monitor screen with the outline of the object and with said distinctive symbols being visible on the screen image and being interpretable by an operator as being constraints on cutting in order to define a cutting program in interactive manner by means of the inputting accessories to said computer system.

BRIEF DESCRIPTION OF THE DRAWINGS

Embodiments of the inventin are described by way of example, with reference to the accompanying drawings, in which.

FIGS. *3a* to *3d* are examples of distinctive symbols in accordance with the invention for use in marking objects.

MORE DETAILED DESCRIPTION

In the example described below, pieces are to be cut out from an animal skin which includes defects that a video camera cannot detect or recognize unless they are prior marked.

Figure 1:
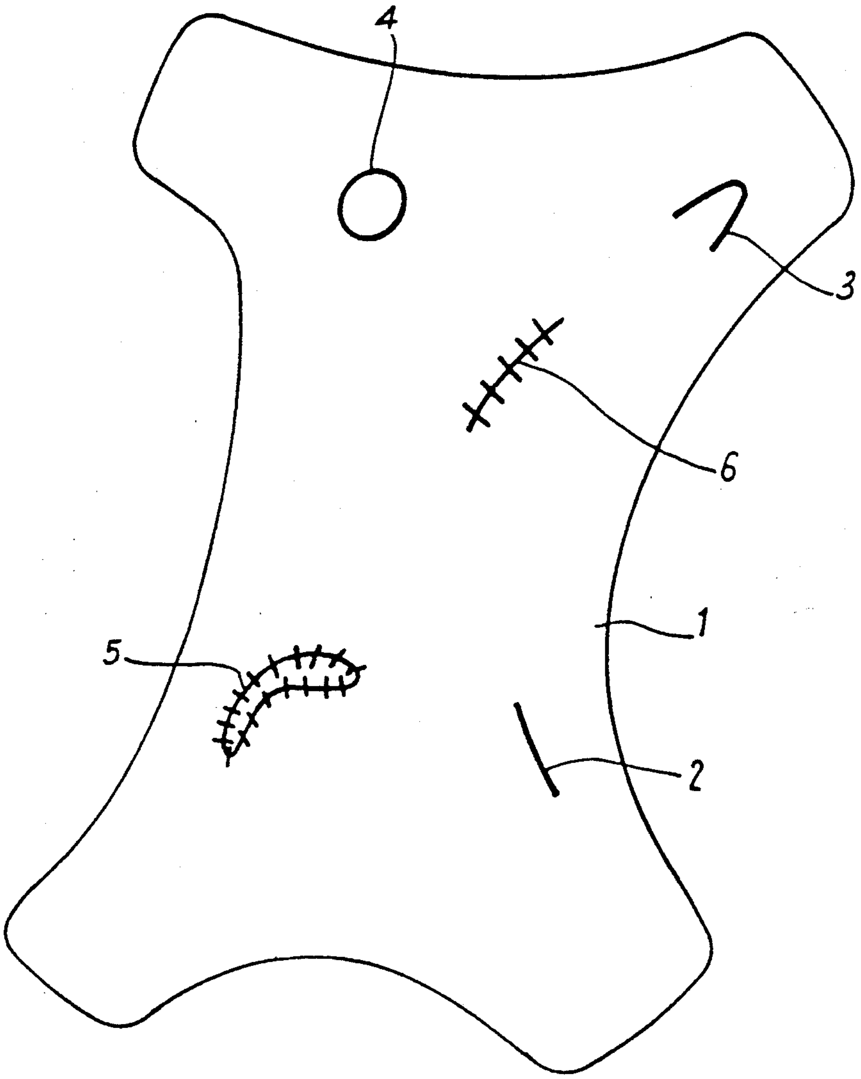
FIG. 1 is a plan view of an animal skin which has been marked using the method of the present invention.

In FIG. 1, an animal skin 1 includes defects that are not shown but which are marked directly on the skin in the form of distinctive symbols 2, 3, 4, 5, and 6 by means of a fluorescent chalk. It is shown below that "cosmetic" type defects 2, 3, and 4 or "structural" type defects 5, 6 are recognized depending on the shapes of said symbols. The term "cosmetic" is used in the present specification to indicate defects in appearance only.

Some defects are allowable on some portions of some pieces. This is true, in particular, of cosmetic type defects when the object is an animal skin. These defects are generally not allowable on a visible portion of a shoe upper, for example, but may exist on other pieces, or on other portions of the same piece, for example on the "lasting". In general, structural type defects should be completely avoided on most types of piece.

Once the defects have been marked manually by a specialist, the skin is spread out on a table. A video camera is placed over the table in order to scan the skin for the purpose of reading the contours of the skin and the symbols marked thereon in order to define a cutting-out program which takes account of the shape of the skin, and also the presence of said defects, or indeed other additional instructions.

Advantageously, and in accordance with the invention, the table on which the skin is spread out is itself fluorescent, thereby enabling the camera to read the contours of the skin in the same way as it reads the symbols. The term "contour" is used herein to designate both the outline of the skin and also the contours of any holes that there may be therein.

In this example, the camera is a linear type video camera which is fixed above the table, and the table moves beneath the camera. This disposition is preferable to the disposition in which the camera moves over the table since it limits problems due to vibration. Further, it is preferable to work with a linear type cameras in order to obtain better image definition.

The scanning speed is adjusted as a function of the required sensitivity and then fixed for a given scan. In practice, it is convenient to work with scanning speeds which are multiples of twice the mains frequency, for example 100 Hz, 200 Hz, 300 HZ, etc. for a mains frequency of 50 Hz; but in some cases the sensitivity required for scanning requires lower scanning speeds, for example between 10 Hz and 40 Hz. Thus, results having a good signal-to-noise ratio have been obtained using a scanning speed of 25 Hz for detecting fluorescent marks which are illuminated by an ultraviolet light source. If a resolution of 1 $mm^2$ is required, a scanning frequency of 25 Hz corresponds, in this example, to a table displacement speed of 25 mm/sec, i.e. 1.5 meters per minute (m/min). An animal skin which is 3 meters long can thus be scanned in two minutes.

Figure 2:
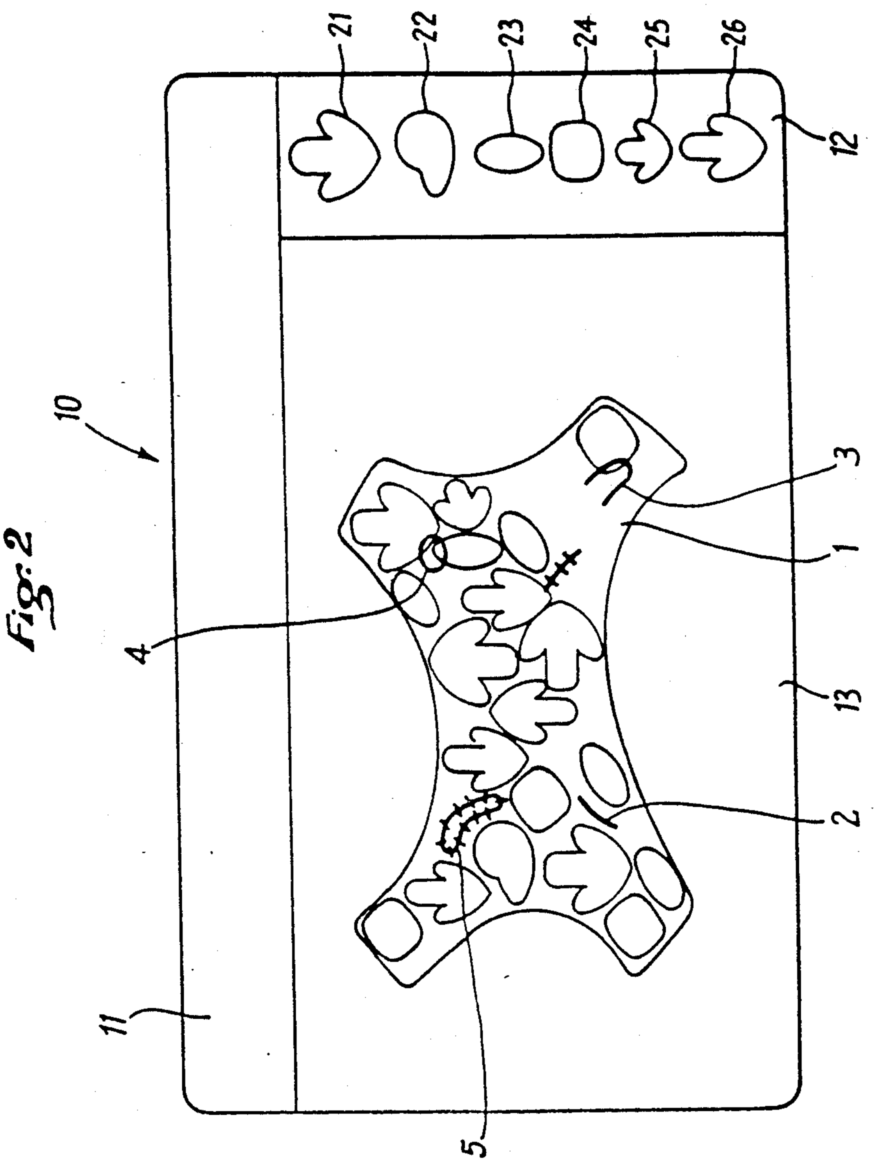
FIG. 2 represents a screen display used for implementing the method of the present invention.

FIG. 2 shows the display on a monitor screen for interactive placing while defining a cutting program. The screen 10 is connected to the computer system which is also connected to said camera, and it is divided into three portions: 11; 12; and 13. The first portion 11 is a dialog zone reserved for displaying alphanumeric instructions for the attention of the operator, which operator has a keyboard and a digitizer table or an inputting accessory of the "mouse" type, known per se by the person skilled in the art, with the various inputting accessories being connected to said computer system. The second portion 12 of the screen 10 displays the shapes of the pieces to be cut out from the skin 1, and an image of said skin 1 is displayed in the third portion 13 of the screen.

By virtue of the fluorescent marking, of the ultraviolet illumination, and of the adjustment of the scanning speed (25 Hz in this case) in accordance with the invention, the symbols 2, 3, 4, 5, and 6 shown in FIG. 1 corresponding to defects have been observed and interpreted by the computer system and they appear on the screen either in their original forms, or else under some other form, after being encoded by the computer system, thereby enabling the operator to take account of said defects while defining the cutting program. In the case shown in FIG. 2, said symbols appear on the interactive placement screen in their original shapes. In order to define the cutting program, the operator displaces the templates 21, 22, 23, 24, 25, and 26 which appear in said second portion 12 of the screen 10 using the keyboard and/or the digitizing table, or else the mouse. The templates have the shapes and sizes of the pieces to be cut out from the skin 1, at a scale appropriate to the display. The computer program loaded in said computer system naturally allows said template to be rotated in order to enable them to be placed as well as possible on the image of the skin 1. This mode of defining said cutting-out program is referred to as the "interactive" mode.

Figure 3A:
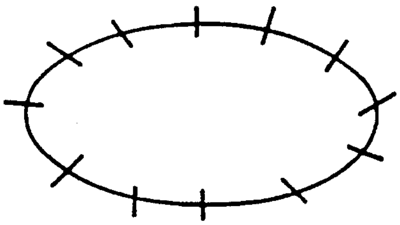
Figure 3B:
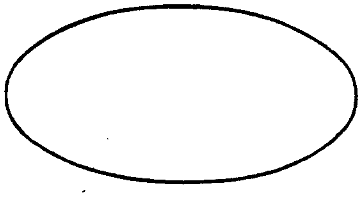
Figure 3C:
Figure 3D:

In this embodiment of the invention, the operator decides whether such-and-such a fault is acceptable on such-and-such a piece to be cut out or on such-and-such a portion of a piece to be cut out. The operator recognizes defect types: cosmetic or structural, and spot or elongate as a function of the symbol which appears on the screen. FIGS. 3*a* and 3*d* give examples of distinctive symbols useable by said specialists in order to mark said defects. Thus, the following code may be used:

a structural type spot defect may be marked with the symbol of FIG. 3*a*;

a cosmetic type spot defect may be marked with the symbol of FIG. 3*b*;

a structural type elongate defect may be marked with the symbol of FIG. 3*c*; and a cosmetic type elongate defect may be marked with the symbol of FIG. 3*d*.

Figure 4:
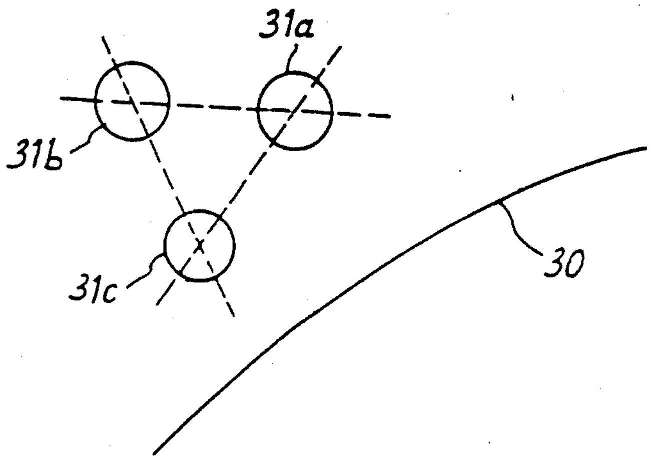
FIG. 4 shows another example of distinctive symbols in accordance with the invention.

Marking may also be performed as follows: once the defects have been surrounded or underlined directly on the skin using the fluorescent chalk, a fluorescent sticker or an arrangement of fluorescent stickers characteristic of the type of defect is stuck to the skin in the vicinity of the defect. This is shown in FIG. 4 which shows what can be seen on the screen, i.e. a chalk mark 30 marking the defect itself together with stickers 31*a*, 31*b*, and 31*c* whose diameters and whose disposition in an equilateral triangle of given side are characteristic of the type of defect.

In another embodiment of the invention, said computer program itself defines the cutting program on the basis of an instruction to cut out as large a number as possible of pieces from the animal skin, with the shape, the orientation, and the defects of the skin after marking by a specialist as mentioned above being detected for said computer system by said camera and then read and interpreted by said computer system which can then take them into account when defining said cutting program.

All sorts of constraints or other indications can thus be transmitted to the computer system or to the operator, not only to prevent certain types of choice being made when defining the cutting program, but also to suggest other types of cutting operation. It is thus possible to reduce the computation time of the computer system or the thinking time of the operator by virtue of the symbols marked by the specialist on the objects to be cut. For example, returning to the case where one said cutting instructions given to the computer system is an instruction to cut out as large a number as possible of pieces of predetermined shape from the skin without any of them being cut out from portions of the skin having defects, the computation time can be greatly reduced if the specialist whose job it is to mark the skin also marks symbols which correspond, for example, to preferred or imposed orientations and/or cuts for certain pieces in certain zones of the skin.

Natually the present invention is not limited to the above-described examples. Numerous technical equivalents may occur to the person skilled in the art without going beyond the scope of the invention. For example, fluorescent marking illuminated by ultraviolet light and associated with adjusting the speed or frequency of camera scanning may also be used for machining three-dimensional objects.

I claim:

1. A method of cutting an object, in particular an object in the form of a sheet, by means of a tool controlled by a computer system and in accordance with a cutting program that may depend on certain particularities of said object, said computer system examining the object by being connected to an object-scanning camera, in particular a video camera, the method including the following steps:

(a) marking at least some of said particularities directly on the object prior to scanning, said marking being manually implemented by an operator using a fluorescent marking means, and said marking being in the form of distinctive symbols which are detectable by said camera and which are interpretable as being constraints on cutting to be taken into account by said cutting program,
(b) placing the object on a fluorescent table,
(c) illuminating said object by a source of ultraviolet light,
(d) simultaneously with step (c), scanning the object with said camera, and
(e) adjusting a scanning speed of said camera as a function of a required sensitivity, the placement of the object on the fluorescent table enabling the camera to discern an outline of the object and contours of any holes in the object.

2. A method of cutting an object, in particular an object in the form of a sheet, by means of a tool controlled by a computer system and in accordance with a cutting program that may depend on certain instructions associated with said object, said computer system examining said object by being connected to an object-scanning camera, in particular a video camera, the method including the following steps:

(a) marking at least some of said instructions directly on the object prior to scanning, said marking being manually implemented by an operator using fluorescent marking means, and said marking being in the form of distinctive symbols which are detectable by said camera and which are interpretable as being constraints on cutting to be taken into account by said cutting program,
(b) placing the object on a fluorescent table,
(c) illuminating said object by a source of ultraviolet light,
(d) simultaneously with step (c), scanning the object with said camera, and
(e) adjusting a scanning speed of said camera as a function of a required sensitivity, the placement of the object on the fluorescent table enabling the camera to discern an outline of the object and contours of any holes in the object.

3. A method according to claim 1 or 2, wherein a range of scanning speeds of said camera is substantially 10 images per second to 40 images per second, corresponding to a scanning frequency of 10 Hz to 40 Hz, preferably about 25 Hz.

4. A method according to claim 1, wherein said object is an animal skin and wherein some of said distinctive symbols correspond to defects in said animal skin.

5. A method according to claim 4, wherein different distinctive symbols are used for defects of different natures, said different distinctive symbols being distinguishable by said computer system.

6. A method according to claim 1 or 2, wherein said distinctive symbols include fluorescent chalk marking to indicate a particular zone of the object, and a fluorescent sticker or an arrangement of fluorescent stickers adhered to said object in a vicinity of said particular zone and characteristic thereof.

7. A method according to claim 6, wherein said particular zone of the object is identified by shapes, sizes, and dispositions of said fluorescent stickers.

8. A method according to claim 1 or 2, wherein said computer system has cutting instructions in its memory, and said distinctive symbols are interpretable by said computer system as being constraints or suggestions for cutting which may be combined with said cutting instructions to enable the computer system to define said cutting program.

9. A method according to claim 1 or 2, wherein said computer system displays on a monitor screen at least an image of the object on which said distinctive symbols are visible and interpretable by an operator as being constraints or suggestions on cutting to define a cutting program in interactive manner by means of input accessories to said computer system.

* * * * *